United States Patent Office 3,489,584
Patented Jan. 13, 1970

3,489,584
PROCESS FOR TREATING A MIXED SOLVENT FOR PREPARING CELLULOSE TRIACETATE FILMS
Kingo Kobayashi and Goro Uehara, Kanagawa, Japan, assignors to Fuji Photo Film Co., Ltd., Kanagawa, Japan
Filed Oct. 11, 1967, Ser. No. 674,668
Claims priority, application Japan, Oct. 12, 1966, 41/67,004
Int. Cl. C08b 21/00; C09j 3/04
U.S. Cl. 106—189                    5 Claims

ABSTRACT OF THE DISCLOSURE

In a process for the preparation of a cellulose triacetate film by a dry solution casting process using as the solvent a mixed solvent comprising (1) at least one hydrocarbon chloride having from 1 to 2 carbon atoms, and (2) a member selected from the group consisting of an alkanol having from 3 to 6 carbon atoms, benzene, toluene, cyclohexane and mixtures thereof the process of reducing the viscosity of the solvent solution of cellulose triacetate, the viscosity of which has been increased in the course of time, which comprises heating the deteriorated solution of cellulose triacetate to a temperature above 35° C., prior to casting, whereby the viscosity thereof is decreased.

BACKGROUND OF THE INVENTION

Field of the invention

The present invention relates to a process for treating a mixed solution for preparing cellulose acetate films, and more particularly, it relates to a process for lowering the viscosity of a mixed solution for preparing cellulose triacetate films, the viscosity of which has been increased in the course of time, in the preparation of cellulose triacetate films by a dry solution casting process.

Description of the prior art

Hitherto, the process for producing a film of cellulose triacetate by the solution process has been usually performed in such manner that cellulose triacetate containing more than 56 percent combined acetic acid is dissolved into a mixed solvent consisting of a lower hydrocarbon chloride, e.g., methylene chloride, and a lower aliphatic alcohol, e.g., methanol. An appropriate plasticizer is added to the solution and after being subjected to purification steps, such as filtration, de-aeration, and adjustment of viscosity (concentration) and temperature or the like, the resulting solution is supplied to a film casting device.

As the solvent in the above process there is frequently used a mixed solvent of methylene chloride and less than about 10 percent by weight, methanol. This mixed solvent is superior industrially in various points of solubility, solution stability, cost, solvent recovery, composition stability and incombustibility.

On the other hand, in consequence of above superior properties of solubility and stability, this solvent has disadvantages in the film forming step.

In the film forming procedure purified solution is extruded into the shape of a film on a movable support by means of an appropriate casting apparatus. Generally, this is called a casting operation and further, the surface of a rotating drum or an endless belt is used as the movable support. The solvent is made to evaporate from the above solution during one rotation of the support and a formed, coagulated film is peeled off from the surface of the support. Then, any residual solvent is evaporated from the peeled film by means of an appropriate dryer.

Consequently, in order to obtain an industrial advantage by promoting the film forming rate, coagulation and peeling of the cast film must necessarily be carried out in a short time. But, the said mixed solvent of methylene chloride-methanol, in consequence of its superior solubility and stability, is rather unsatisfactory in regard to the rate of coagulation and peeling.

Therefore, recently, a mixed solvent, containing a poor solvent has come to be used and thereby, coagulation and peeling speeds are improved.

Further, the new mixed solvents are recognized simultaneously to have an effect on improving the mechanical strength of the dried film.

A mixed solvent for the above object contains a main solvent of a lower hydrocarbon chloride, having usually one or two carbon atoms, and a mixed poor solvent consisting of methanol or ethanol and at least one alcohol, having three to six carbon atoms, or at least one aromatic compound, such as, benzene toluene, cyclohexane or the like.

In the dissolving step, in which cellulose triacetate is dissolved into the mixed solvent containing the poor solvent, it is very difficult, as compared with the use of the aforesaid mixed solvent of methylene chloride and methanol, to obtain a transparent solution free from insoluble particles. In other words, its solubility is lowered.

Further, to make matters worse, the said solution is relatively unstable. Specifically, the inventors discovered that such solutions rapidly increase in viscosity in the lapse of time during the steps of dissolution, purification and film forming. This phenomenon is industrially disadvantageous in the case of employing such a mixed solvent.

A solution of cellulose ester is different from viscose and some kinds of fused thermoplastic resin and has the great feature that the solution is almost free from a change of its properties with the elapse of time. But an increasing viscosity of solution after an elapse of time makes it difficult to carry out the procedures of dissolution, purification and film formation.

To overcome the above difficulties, it is proposed that the time of solution stagnation shall be satisfactorily minimized from the dissolving step to the film forming steps. But this raises great difficulties and disadvantages in view of the requirements of industrialization. Further, no measure has been found to avoid the occurrence of increased viscosity. The object of the present invention is to recover the increased viscosity with the lapse of time to the viscosity present in the initial state of the solution of cellulose triacetate containing the above poor solvents.

SUMMARY OF THE INVENTION

The inventors discovered that the increased viscosity experienced with the lapse of time can be suppressed if the temperature of the solution is once raised to above 35° C., and thereby the initial viscosity value is immediately recovered after the components are dissolved.

DETAILED DESCRIPTION OF THE INVENTION

The present invention relates to a process for producing a film of cellulose triacetate which comprises a film forming procedure for cellulose triacetate by the solution casting process. The cellulose triacetate is dissolved in a mixed solvent of a hydrocarbon chloride having one or two carbon atoms, and at least one alcohol having three to six carbon atoms, or an aromatic compound e.g., benzol, toluene or cyclohexane, as a solvent. In the steps of dissolution and purification of the solution, a temperature of solution is once raised in excess of 35° C., and thereby an increased viscosity with the elapse of time is suppressed and the initial viscosity is substantially recovered.

The temperature to which the solution is raised to depress the increase in viscosity with the elapse of time, to recover the initial viscosity and to improve the other industrial advantages, e.g., homogeneity of the solution is desirably higher than 35° C., but a rise in temperature which surpasses remarkably the boiling point of the solution, makes it difficult to control the evaporation of the solvents from the solution and this is uneconomical and is not desirable.

Consequently, a preferable temperature for treatment under atmospheric pressure is usually selected in the range of 35 to 45° C., for a mixed solvent which contains methylene chloride as the main component, and a temperature in the range of 40 to 85° C., is selected for a mixed solvent which contains ethylene chloride as the main component.

Particularly, when a solution having a very increased viscosity is treated, the temperature is firstly raised in excess of the boiling point and thereby the viscosity is depressed and recovered to some extent. Then, if necessary, mixing and thermal conduction are pacified by means of agitating or the like, and, simultaneously, the temperature is raised again even higher and this is advantageous. Examples in which a solution containing the subject poor solvents are employed and the viscosity increase with the elapse of time are set forth and illustrated below.

Example I (comparison)

100 parts of cellulose triacetate (polymerization degree: 250. Amount of combined acetic acid: 61.5 percent. These figures are applicable for this case and hereinafter), 15 parts of triphenylphosphate, 461 parts of methylene chloride, 26 parts of ethanol and 37 parts of n-butanol were dissolved in each other and purified. The temperature of solution was kept at 16° C. The viscosity of the solution was 375 poises immediately after the components were dissolved and 1,320 poises after the elapse of 7 days after dissolution.

Example II (comparison)

100 parts of cellulose triacetate, 15 parts of triphenylphosphate, 400 parts of methylene chloride, 14 parts of methanol and 46 parts of n-butanol were dissolved in each other and purified. The temperature of solution was kept at 17° C. The viscosity of the solution was 726 poises immediately after the components were dissolved and 5,770 poises after the elapse of 72 hours after dissolution. Further, the solution had a viscosity of 8,800 poises after the elapse of 144 hours.

Example III (comparison)

100 parts of cellulose triacetate, 15 parts of triphenylphosphate, 377 parts of methylene chloride, 46 parts of methanol and 37 parts of cyclohexane were dissolved in each other and purified. The temperature of solution was kept at 18° C. The viscosity of the solution was 302 poises immediately after components were dissolved, and further it was 473 poises and 620 poises after the elapse of 28 hours and 54 hours respectively. Then, after the elapse of 78 hours, it indicated 687 poises.

Referring to the above examples, it is disclosed that the increase in viscosity of the solution after the elapse of time was in the range of from 2 to 20 multiples, compared with the viscosity immediately after solution.

Another comparison example in which a conventional mixed solvent of methylene chloride-methanol was employed and the viscosity increase with the elapse of time was not so high is set forth below:

Example IV (comparison)

100 parts of cellulose triacetate, 15 parts of triphenylphosphate, 423 parts of methylene chloride and 37 parts of methanol were dissolved in each other and purified. The temperature of the solution was kept at 16.5° C. The viscosity of the solution was 742 poises immediately after the components were dissolved and 907 poises after the elapse of 72 hours.

An example in accordance with the process of the present invention, in which a mixed solution of poor solvents is employed and the increase in viscosity with the elapse of time is recovered, is illustrated below:

Example

A solution, after the elapse of 72 hours as prepared in Comparison Example II, was treated at the following temperatures and the results are set forth below:

(1) The temperature of the solution was raised to 30° C.:
The viscosity of the solution was depressed from 5,770 poises to 1,100 poises.

(2) The temperature of solution was once raised to 39° C. and then depressed to 30° C.: The viscosity of the solution was depressed from 5,770 poises to 237 poises.

The viscosity of the solution in this example was 237 poises at 30° C., immediately after components were dissolved.

Consequently, according to the description (1), it is disclosed that a treatment at a temperature of 30° C., gives about 4.6 multiples of viscosity, compared with the initial viscosity immediately after dissolution. (1,100 poises as compared with 237 poises.)

Compared with about 8 multiples of viscosity at 17° C., after the elapse of 72 hours in Comparison Example II (5,770 poises in proportion to 726 poises), this figure indicates a recovery effect to some extent, but it is understood that the recovery is not satisfactory.

According to the description (2), namely a treatment by a rise in temperature to 39° C., in the process of the present invention, the increased viscosity is depressed and recovered to the initial viscosity immediately after dissolution.

Further, according to the description (1), a treated solution which was kept at 30° C., after the elapse of 66 hours after treatment, has a viscosity of 825 poises.

Consequently, it is understood that in the case of employing 30° C. of temperature for the treatment, the effect of the viscosity recovery is not enhanced, even if the time of treatment is prolonged, but an effect which enables one to suppress the increase in viscosity with the elapse of time was recognized.

Referring to the above examples, it is disclosed that a recovery effect for the increase in viscosity with the elapse of time is determined by the treating temperatures applied, but is not effected by the time of the treatment.

In order to suppress or recover the increase in viscosity experienced with the elapse of time by the process of the present invention, the treating condition is not necessarily specified as being applied at one particular step through all the procedures of solution and purification.

According to allowable scope of the rate viscosity increase and the requirements of the operations and other conditions, the temperature treatment may be carried out at any optional time and at an appropriate temperature. Further, the best temperature may be optionally determined after treatment.

According to the process of the present invention, the increase in viscosity experienced after an elapse of time can be easily recovered for a solution of cellulose triacetate which contains the above poor solvents.

Therefore, a stagnating period for the solution can be prolonged in all the steps of dissolution and purification, without causing any problem.

Further, according to the process in the present invention, a partial lack of homogeneity does not arise in the viscosity of solution, particularly in the event of performing a casting operation. Homogeneity of viscosity in the casting solution is an indispensable element for obtaining a film product which has even thickness and superior flatness.

So, the process of the present invention is particularly suitable for producing a film which is used as a photographic film base and is required to have superior quality in the above respects.

What is claimed is:

1. In a process for the preparation of a cellulose triacetate film by a dry solution casting process using as the solvent a mixed solvent comprising (1) at least one hydrocarbon chloride having from 1 to 2 carbon atoms and (2) a member selected from the group consisting of an alkanol having from 3 to 6 carbon atoms, benzene, toluene, cyclohexane and mixtures thereof, the improvement which comprises reducing the viscosity of the solvent solution of cellulose triacetate, the viscosity of which has been increased to at least double its initial viscosity due to the passage of time by heating said solution having an increased viscosity to a temperature above 35° C., prior to casting, whereby the viscosity thereof is decreased to at least the initial viscosity value immediately after the components were dissolved.

2. The process as claimed in claim 1 wherein said hydrocarbon chloride is methylene chloride and said solvent solution is heated to from 35° to 45° C.

3. The process as claimed in claim 1 wherein said hydrocarbon chloride is ethylene chloride and said solvent solution is heated to from 40° to 85° C.

4. The process as claimed in claim 1 wherein said hydrocarbon chloride is selected from the group consisting of methylene chloride and ethylene chloride.

5. The process as claimed in claim 1 wherein said mixed solvent additionally contains a member selected from the group consisting of methanol and ethanol.

References Cited

UNITED STATES PATENTS

| | | | |
|---|---|---|---|
| 1,375,208 | 4/1921 | Carlsson et al. | 106—198 |
| 2,607,704 | 8/1952 | Fordyce et al. | 106—189 |
| 2,680,693 | 6/1954 | Groombridge et al. | 106—189 |
| 2,739,069 | 3/1956 | Fordyce et al. | 106—189 |
| 2,858,228 | 10/1958 | Hughes | 106—198 |
| 2,858,229 | 10/1958 | Hughes | 106—198 |

FOREIGN PATENTS 779,220   7/1959   Great Britain.

MORRIS LIEBMAN, Primary Examiner

H. H. FLETCHER, Assistant Examiner

U.S. Cl. X.R.

106—190, 191, 198